Dec. 15, 1970  H. ZÄPFEL  3,546,904
APPARATUS FOR TREATING INDIVIDUAL CHARGES OF MATERIALS
IN FLUIDS WITHOUT PRESSURE
Filed Sept. 5, 1968  4 Sheets-Sheet 1

INVENTOR.
Horst Zäpfel

BY Craig and Antonelli
ATTORNEYS

INVENTOR.
Horst Zäpfel

BY Craig & Antonelli
ATTORNEYS

United States Patent Office 3,546,904
Patented Dec. 15, 1970

3,546,904
APPARATUS FOR TREATING INDIVIDUAL
CHARGES OF MATERIALS IN FLUIDS
WITHOUT PRESSURE
Horst Zapfel, Karlsruhe-Durlach, Germany, assignor to
Badische Maschinenfabrik G.m.b.H., Karlsruhe-Durlach, Germany
Filed Sept. 5, 1968, Ser. No. 757,709
Claims priority, application Germany, Sept. 11, 1967,
1,660,046
Int. Cl. D06f 39/04, 39/02
U.S. Cl. 68—16    20 Claims

ABSTRACT OF THE DISCLOSURE

A stationary horizontal container of a sector-shaped cross section and open at the top in which materials, for example, animal skins or textiles, are treated by being circulated in a treating fluid by a plurality of rings which are rotated closely along the inner wall of the container about the horizontal axis of the container by belts or the like which extend around the rings and are driven by a common drive shaft on the outside of the rings.

---

The present invention relates to an apparatus for subjecting individual charges of materials, especialy sheet materials such as animal skins, textiles or the like, to chemical or physico-chemical treatments without pressure in treating fluids.

Prior to this invention it has been conventional to treat animal skins in tanneries, for example, by soaking, liming, deliming, tanning, dressing, greasing, washing, and the like, in cylindrical or bellied barrels mostly of wood, of different dimensions which are rotated about a horizontal axis. The end walls of such barrels are provided with journals which are rotatable in bearings, and the barrels are driven individually or in groups at the speed which is the most suitable for the particular treatment.

The length and diameter and thus also the capacity of the conventional tanning barrels are limited because of the manner in which they are mounted and because of the barrel material. This has not only the disadvantage of a slower operation since the length of time of treating each charge cannot be considerably affected by outside influences so as to permit the charges to be changed as frequently as desired, but it also has the disadvantage that larger quantities of the same raw material cannot be treated in one charge which is desirable in order to attain a material which is treated absolutely uniformly.

Such barrels can be filled only when standing still through an opening in the peripheral wall of the barrel which must thereafter be tightly closed. For this purpose it is necessary to turn the barrel to a position in which the opening faces upwardly. For emptying the barrel it must be turned so that the barrel opening is in its lowest position and after this opening is uncovered, the contents of the barrel are usually emptied into a conveying vessel which is placed underneath the barrel. The space which is required for such a conveying vessel underneath the barrel necessarily increases the height of the entire barrel structure and thus also the height to which the material to be treated has to be lifted when the barrel is to be charged and which also determines the minimum height of the hall in which these barrels are mounted.

The operation of filling the barrels with the required treating fluid is likewise carried out when the barrel is stopped and its opening faces upwardly. The journals of the barrel are usually made of a tubular shape so as to permit additional treating fluid in the form of liquid or dissolved chemicals or water to be passed through these journals into the barrel.

The conventional tanning barrels also have the disadvantage that the material to be treated cannot be inspected during the treatment. Furhermore, while the treatment is being carried out it is hardly possible to supervise the physical condition of the treating fluid, for example, its temperature, PH value, and its concentration. Although auxiliary devices are known for withdrawing samples of the treating fluid through the hollow journals, the construction and operation of these devices is difficult and they also have the tendency to become clogged which may result in occasional breakdowns in the treatment. Furthermore, the withdrawal of samples of the treating substances is not even possible in all cases since the treatments are often carried out with very little treating fluid or even entirely without fluid.

The disadvantages of the conventional tanning barrels and of their use in carrying out the desired treatments may therefore be summarized to be as follows: The limited capacity of such a barrel; the large space needed by it in height; the possibility of charging and discharging only when the rotation of the barrel is stopped and the barrel is turned to a particular position, the inability of supervising the condition of the treating fluid at all times during the treatment; the inaccuracy in regulating the condition of the fluid during the treatment; the impossibility of visually observing either the treating fluid or the material to be treated; the small charges; the long time required for each charge because of the necessity of charging and discharging the barrel while standing still; and the long and expensive manual operations in charging and discharging the barrel.

It is an object of the present invention to provide an apparatus of the type as mentioned at the beginning which overcomes all of the disadvantages of the conventional barrels and their operation as recited above.

For attaining this object, the invention provides a stationary, horizontally-disposed trough-shaped container of a sector-shaped cross section and of any desired length, and a mechanism for moving the material to be treated within the container independently of the latter. This mechanism comprises a plurality of parallel circular rings within the container which are spaced from each other and extend transverse to the longitudinal axis of the inner wall of the container, are spaced at a small uniform radial distance from the inner wall surface of the sector-shaped container, are individualy guided so as to be rotatable concentrically to each other within parallel planes and at a certain height or level, are rotatable from about by means of flexible driving elements which may be driven by a drive unit the driving direction of which is reversible and which are provided with inwardly projecting parts which are adapted to take along the material to be treated in the direction of the rotation of the circular rings.

For attaining the object of the present invention it is therefore of paricular importance that the means for revolving the material to be treated and for mixing the treating fluid are independent of the stationary container. By designing the apparatus in this manner, the following advantages will be attained:

(1) The length and capacity of the container are independent of the static conditions and may be made of any desired size;

(2) The container may be charged and discharged independently of its position and independently of any stage of the treatment, even while the driving means for revolving the material to be treated and for mixing the treating fluid are in rotation;

(3) The apparatus permits the conditions of the treating fluid to be supervised at any time during the treatment;

(4) It also permits the material to be visually observed at all times while being treated;

(5) It permits individual pieces of the material, for example, samples, to be removed during the treatment;

(6) The apparatus may be operated practically without idle times; and (7) The number of manual operations and the time required for them during the entire treatment are reduced considerably as compared with the manual operations which had to be carried out prior to this invention.

Another feature of the invention consists in driving the circular rings by means of a common drive shaft which extends parallel to the axes of these rings and perpendicularly above a line connecting the highest points or apexes of these rings. This drive shaft is preferably connected by a releasable clutch to a geared motor the direction of rotation of which is reversible and the speed of which may be varied.

The proper operation of the apparatus requires the circular rings to be accurately guided within the plane of their rotation and also to maintain them at a uniform level. This may be attained by different means. In order to maintain the inside of these circular rings within which the material to be treated is revolved as free as possible of any other structure, the invention provides at the outside of each circular ring a pair of pressure rollers which are rotatably mounted in fixed positions at both sides of and spaced from the apex of the ring with their axes extending parallel to the axis of the ring. These pressure rollers which act upon the circular rings and possibly also upon the flexible driving elements thereof serve as means for guiding these driving elements and especially also the rings so as to maintain the latter at a certain elevation and concentrically to each other and to the inner wall surface of the container.

Another feature of the invention consists in providing further guide means for guiding each circular ring in lateral directions. These guide means may consist of a pair of guide rollers whch are rotatable about perpendicular axes in fixed positions directly adjacent and at both sides of the apex of each ring so as to engage with the opposite lateral sides thereof. In cooperation with the driving elements, these guide rollers insure that each of the circular rings will always rotate within the same perpendicular plane. Each of the guide rollers is preferably provided with an annular flange, and the flanges of each pair of these guide rollers engage with and support the inner side of the ring. These flanges together with the mentioned pressure rollers form a three-point support of each ring to maintain it at all times at the same elevation and concentrically to the other rings and to the inner wall surface of the container. These flanges have the additional purpose of supporting the weight of the rings themselves as well as of the load which they have to bear.

The flexible driving element may consist of chains or of flat, serrated or V-shaped belts. In one preferred embodiment of the invention, the circular rings are driven by V-belt drives in which the common drive shaft carries a plurality of V-belt pulleys and the outer periphery of each ring is provided with a groove of a shape in accordance with the V-belt. By extending over the V-belt pulley on the drive shaft and around the circular ring within the groove thereof, the V-belt is not only adapted to drive the circular ring but also to suspend it and to support its weight.

The pressure rollers as previously mentioned may also serve as additional lateral guiding means for the circular rings. The peripheral surface of each of these rollers may for this purpose be provided with a central projection which has inclined lateral surfaces so as to project slightly into the V groove of the circular ring and to engage with the opposite walls thereof. The pressure rollers thus also guide each circular ring positively in lateral directions.

For further guiding the circular rings in lateral directions and for preventing any of the material to be treated to pass into the annular gap between the inner wall surface of the container and the outer peripheral surface of each ring, the invention further provides protective arcuate guide strips which are secured to the inner wall of the container at both sides of each circular ring and preferably consist of an arcuate rail of a U-shaped cross section between the arms of which the ring is slidable while rotating.

In order to prevent the treating fluid and the material to be treated from being affected by corrosive metal, the circular rings must be made of a material which is chemically resistant to the chemicals contained in the treating fluid. They may be made, for example, of extruded strips of plastic which are provided with reinforcing steel inserts and, after being bent to a circular shape, are welded so as to secure the ends of each strip together and thus to form a ring. The inwardly extending projections on each circular ring for taking along the material to be treated are then preferably provided in the form of radially extending lugs which are secured to the inner peripheral surface of each ring, for example, by screws which are screwed into the steel inserts of the ring. For the same reason it is advisable also to make the lateral guide rollers and the pressure rollers of plastic or to cover them with plastic.

For draining the container, it may be provided, for example, on one end wall with a drain valve which is preferably prevented from being clogged by providing a coarse removable sieve at the inside of the container in front of the drain valve.

Since it is often desirable or necessary to add solid chemicals to the treating fluid while the treatment is being carried out, the longitudinal wall of the container may be provided between the circular rings with suitable means, for example, a funnel tube, a filter tube, a proportioning device such as a weighing scale or the like.

In order to permit the treatments to be carried out at temperatures other than the room temperature, the invention further provides the container with suitable means for heating or cooling the same, for example, by providing it with a double wall so as to form an intermediate channel or channels through which a gaseous or liquid heating or cooling medium may be conducted. The space between the two walls may also be provided with electric heating means.

Since according to the invention the container is open at its upper side, the treating fluid as well as the material to be treated are easily accessible at all times, even while the circular rings are being driven and the material may be easily inserted into and removed from the container by hand at all times. The apparatus according to the invention may, however, be further improved by the provision of suitable depositing or conveying means which extend from one end of the container into the free area at the inside of the circular rings above the level of the treating fluid or are movable into this area. These means may be designed so as to permit the pieces of the material to be treated to be automatically inserted into or removed from the apparatus. During the treatment of each charge, the circular rings may be driven either only in one direction or alternately first in one direction and then in the other direction as may be controlled manually or automatically in accordance with a predetermined program. The inwardly extending projections on the rotating circular rings then take along the pieces to be treated to a position above the treating fluid near the apex of the rings and these pieces then slide off the projections and drop back into the fluid. If, after the treatment has been carried out for the required time the depositing or conveying means are inserted into the area through which the pieces of the treated material normally drop from the projections back into the fluid, these pieces will be deposited on these means and may be retracted thereon from the apparatus.

If the depositing means consist of a simple board, this board may remain in the sector of the circular rings above the treating fluid until all pieces of the charge are withdrawn from the fluid, if necessary by manual assistance, and are deposited on this board which is then removed with its load from the apparatus. If a conveyer belt is employed which may be moved into and out of the rings above the treating fluid, the pieces which are treated may be moved at different times out of the apparatus in the direction toward one end thereof. In any event, when employing either a depositing element or a conveyer which may be moved into and out of the apparatus, the operation and treatment may be carried out according to any desired program during which the direction of rotation of the circular rings may also be changed at will. The conveying means or their supporting elements may also extend at all times transversely through the circular rings at one side of the common perpendicular central plane of the rings. Of course, in this event it is not possible to change the direction of rotation of the rings during the treatment but only at the end of the treatment when the treated materials are to be deposited on these conveying means and to be removed by them from the apparatus.

The container when of a normal design may have a cross-sectional shape of a sector with a sector angle of about 200 to 240°. Instead of being of such a shape, one longitudinal wall portion of the container may also be bent upwardly and outwardly of the sector at least between the adjacent circular rings and extend as a tangent on the sector at an acute angle to the horizontal plane. In this case, the treated material may be removed from the side of this tangential wall, for example, through an opening in this wall which may be closed by a cover.

All these as well as additional features and advantages of the present invention will become further apparent from the following description of two preferred embodiments thereof which is to be read with reference to the accompanying drawings, in which:

FIG. 4 shows an enlarged radial cross section of one of the circular rings between the pair of lateral guide rollers, as seen in a side view; while

Figure 1:
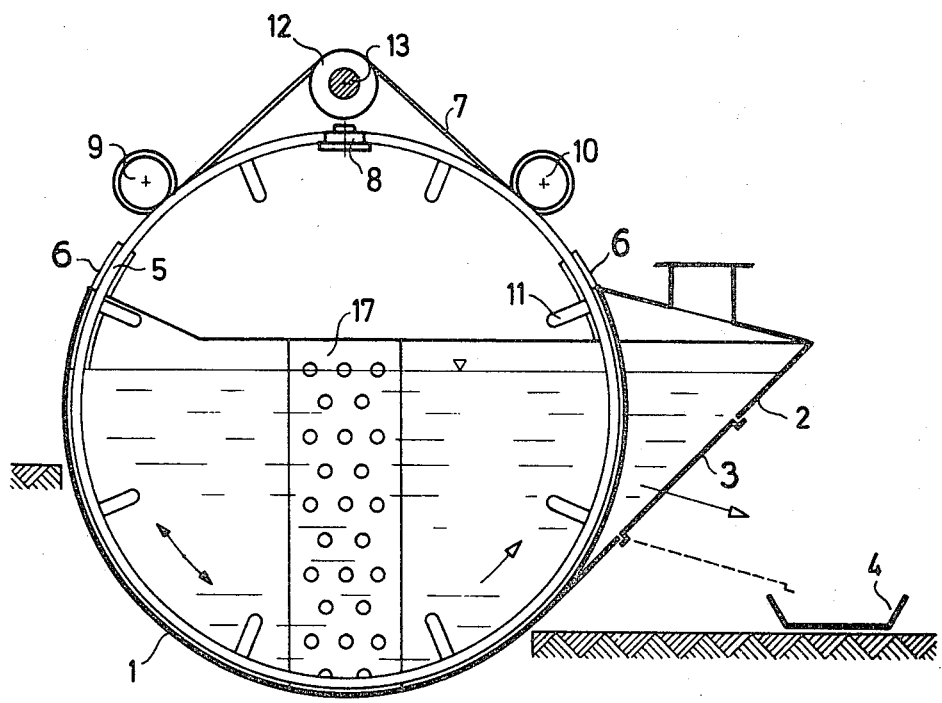
FIG. 1 shows a vertical cross section of the apparatus according to a first embodiment of the invention.

As illustrated in FIG. 1 of the drawings, the apparatus according to the invention comprises a stationary horizontal trough-shaped container 1 of a sector-shaped cross section of a sector angle of about 200° to 240° which is open at the top. Independently of this sector-shaped wall of the container 1, the latter contains a plurality of circular rings 5 for revolving the material to be treated. For laterally guiding these rings 5 and for preventing any material from being caught in the annular gap between the container wall and the circular rings 5, protective guide rails 6 of a U-shaped cross section are secured to the inner wall surface of the container and each of them embraces both sides of each ring 5 and extends up to the upper edges of the container 1 or even beyond these edges. For removing the treated material from the container, one longitudinal side wall thereof is provided with apertures between the adjacent guide rails 6 and an additionally upwardly and outwardly inclined wall 2 is secured to the main container wall 1 underneath these apertures and forms a tangent on wall 1 extending at an acute angle to a horizontal plane. This wall 2 is provided with an opening which may be closed by a cover 3 and underneath which a trough-shaped conveyer 4 is movable. When the treatment is completed and the circular rings are stopped, the treated material may be withdrawn by hand through the apertures in the container wall 1 between the rings 5 and through the opening 3 and be deposited in the conveyer trough 4.

The circular rings 5 are driven by means of V-belts 7 which have a strength and tension sufficient to bear the weight of the rings 5 even when loaded by the material to be treated. At the apex of each ring 5 and its path of rotation, a pair of guide rollers 8 are mounted in a fixed position on means not shown so as to be disposed opposite to each other and in engagement with the opposite sides of each ring 5 so as to guide the same in lateral directions. On their lower ends, these guide rollers 8 have annular flanges 18, as shown particularly in FIG. 4, which engage with the lower side of the respective ring 5 and take up the weight of ring 5 and maintain it at the proper level. In connection with the guide rails 6 and further guide means as subsequently described, these guide rollers insure that the rings 5 are positively guided in lateral directions and remain concentrically to each other. Between the upper edges of the guide rails 6 and the first points of engagement of each belt 7 with the rings 5 underneath the belt pulley 12, a pair of pressure rollers 9 and 10 are mounted which act upon the ring 5 and in cooperation with the flanges 18 on guide rollers 8 insure a concentric rotation of these rings. As shown particularly in FIG. 5, each pressure ring 9 and 10 is provided at the center of its peripheral surface with a flange 20 which engages slightly into the peripheral groove 23 of the respective ring 5 in which the V-belt 7 is running and also engages upon the outer edges of the walls of this groove and thus further insures that the rings 5 are positively guided in lateral directions.

Figure 4:
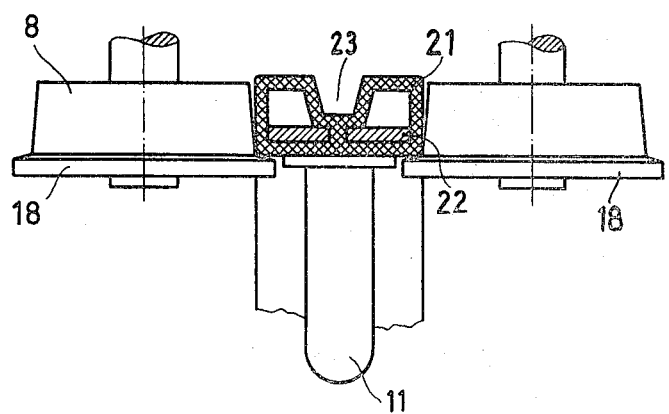
Figure 5:
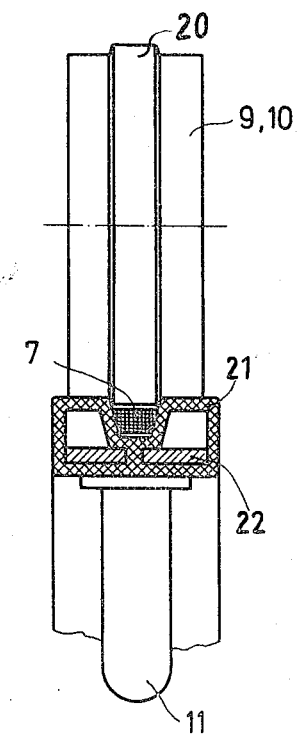
FIG. 5 shows a similar cross section of one of the circular rings together with a side view of one of the pressure rollers.

On the inner surface of rings 5 and at suitable distances from each other, work-driving lugs 11 are mounted. Rings 5 consist of hollow plastic of a cross-sectional shape as shown in FIGS. 4 and 5 in which reinforcing steel inserts 22 are embeded to which the lugs 22 are secured by screws, not shown.

All of the circular rings 5 are driven by a common drive shaft 13 on which the V-belt pulleys 12 are mounted. This drive shaft 13 is connected by a releasable clutch 14 to a geared motor 15 which is provided with a pole reverser and is adjustable to run at different speeds.

For draining the treating fluid from the container 1 when it is to be newly charged or when the container 1 is to be cleaned, the latter is provided with a drain valve 16 and with a removable coarse filter 17 adjacent to this valve. The mode of operation of the apparatus according to the invention as above described is as follows:

After treating fluid has been poured into the container 1, the material to be treated, for example, skins, is inserted by pressing it between the circular rings 5 or into the ends of the container while the rings 5 are either driven or stopped. During the treatment, rings 5 are driven in a clockwise direction or first in one and then in the other direction which may be controlled by hand or automatically in accordance with a predetermined program, whereby the material is taken along upwardly by the driving lugs 11 and then drops back into the treating fluid. During the treatment, the material as well as the treating fluid may be easily inspected from above.

At the end of the treatment, the direction of rotation of motor 15 is reversed so that the circular rings 5 will then rotate at a low speed in the counterclockwise direction and the treated material will be carried upwardly along the inclined wall 2 where it may be withdrawn either at the open upper end of the inclined wall or through its opening after the cover 3 has been opened. When the rotation of the rings 5 is stopped, the operator may also easily reach through the apertures between the rings to withdraw any material which has remained within the rings.

Figure 2:
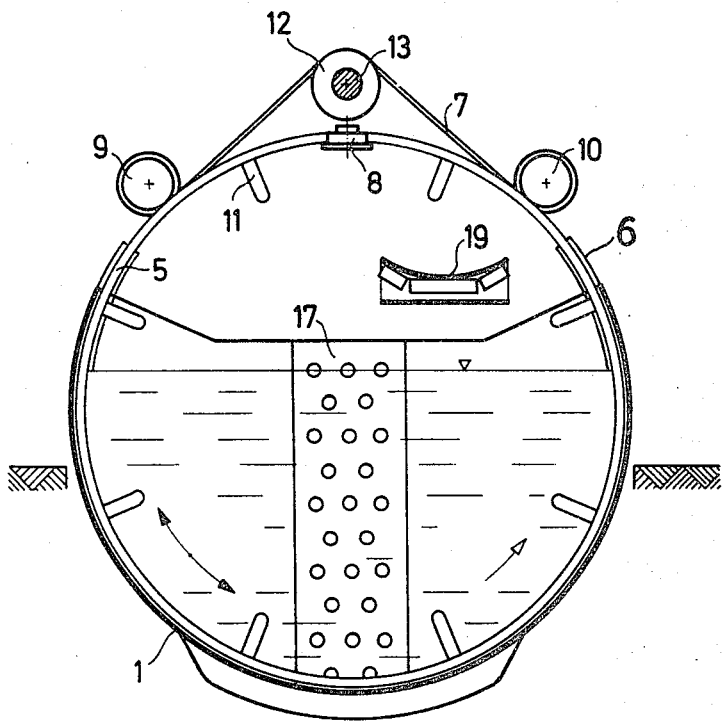
FIG. 2 shows a vertical cross section of the apparatus according to a second embodiment of the invention.
Figure 3:
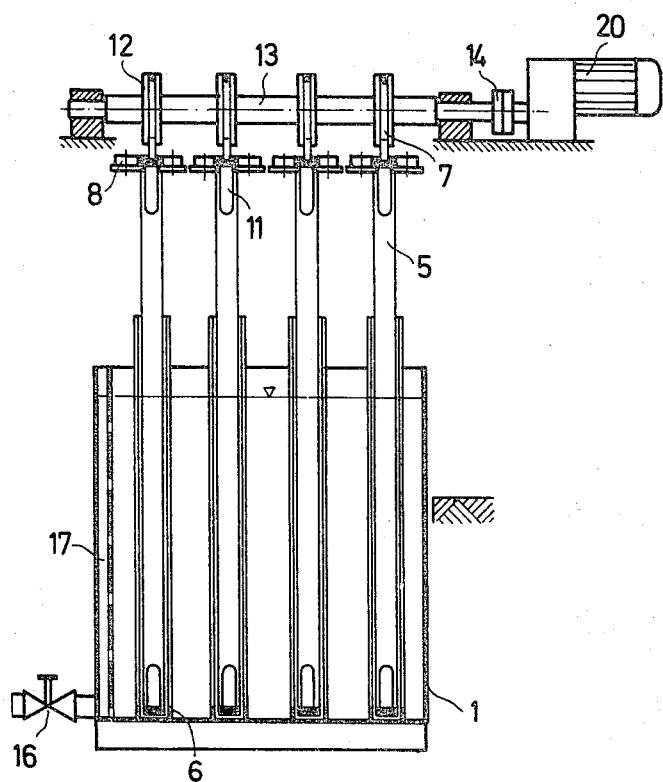
FIG. 3 shows a vertical longitudinal section of the apparatus according to FIG. 1.

The apparatus according to the second embodiment of the invention as illustrated in FIG. 2 differs from the first embodiment as above described merely by the shape of the container 1 and by the provision of a special mechanism for removing the treated material from the apparatus. The trough-shaped container 1 has in this case a symmetrical, partly cylindrical shape and a conveyor belt 19 may be passed either to different positions between th circular rings 5 or entirely through the apparatus from one end thereof above the level of the treating fluid. This conveyor belt 19 may be used for depositing thereon the treated pieces of material or also for inserting the untreated material into the areas between the rings 5. When the rings 5 are turned in the counterclockwise direction, the material which has been taken along by the projecting lugs 11 will be dropped from the latter upon the conveyor belt 19 and will then be removed from the apparatus.

The embodiments of the invention as illustrated in the drawings are merely to be regarded as examples of the manner in which the broad concept of the invention may be realized, namely, to provide a stationary container for the treating fluid and independently therefrom a mechanism for revolving the material to be treated, for example, animal skins or textiles, within the container.

Having thus fully disclosed my invention, what I claim is:

1. Apparatus for subjecting individual charges of materials to chemical and physico-chemical treatments without pressure in treating fluids comprising a stationary, horizontal, trough-shaped container having a sector-shaped cross section and an open top and any desired length, and means independent of said container for moving said materials within said container, said means comprising a plurality of circular rings within said container spaced from each other and extending transverse to the longitdinal axis of the inner wall of said container and spaced at a small substantially uniform radial distance from the inner wall surface of said container, and guide means for individually guiding said rings within said container so as to be rotatable within parallel planes at a certain height concentrically to each other and to said inner wall of said container and having inwardly extending projections for taking along said materials, and means for driving said rings from above comprising a common drive unit, and flexible driving elements connecting said drive unit with said rings.

2. Apparaaus as defined in claim 1, in which said drive unit comprises a common drive shaft extending parallel to the axes of said rings and said container and disposed vertically above the apexes of said rings, transmiting means on said shaft for driving said flexible driving element, a geared motor adapted to rotate in opposite directions and to be varied in speed, and releasable clutch means connecting said motor to said shaft.

3. An apparatus as defined in claim 1, in which said guide means comprise a pair of pressure rollers associated with each ring and disposed substantially within its plane and rotatably mounted in fixed positions outside of said ring at both sides of the apex of said ring above the upper edges of said container and having axes extending parallel to the axis of said ring, said pressure rollers engaging with and acting upon said rings between the first point of engagement of said flexible driving elements with said rings and the upper edges of said container.

4. An apparatus as defined in claim 3, in which said guide means further comprise a pair of guide rollers for each ring mounted in fixed positions and rotatable about perpendicular axes and engaging with the opposite lateral sides of said ring substantially at the apex thereof for guiding each ring in lateral directions.

5. An apparatus as defined in claim 2, in which said driving elements consist of V-belts, said transmitting means comprising V-belt pulleys mounted on said shaft, each of said rings having an annular groove in its outer peripheral surface, said V-belts connected to said pulleys and engaging into said grooves for driving said rings.

6. An apparatus as defined in claim 3, in which the peripheral surfaces of said pressure rollers and said rings have interengaging projections and recesses for guiding said rings in lateral directions.

7. An apparatus as defined in claim 4, in which each of said rings has an annular groove in its outer peripheral surface, said drive unit comprising a common drive shaft, a plurality of V-belt pulleys mounted on said shaft, means for driving said shaft, and a V-belt on each of said pulleys and engaging said annular groove, each of said pressure rollers having a central annular flange on its peripheral surface engaging into said annular groove of one of said rings, each of said guide rollers having an annular flange engaging with the inner side of said rings so as to support said ring and to maintain it at a fixed level and concentrically to the other rings and to the inner wall of said container.

8. An apparatus as defined in claim 2, in which said flexible driving elements have a sufficient strength so as to suspend said rings thereon and to bear the weight of said rings and at least said materials which might be deposited thereon.

9. An apparatus as defined in claim 1, in which said guide means comprise a pair of arcuate guide strips for each of said rings secured to the inner wall surface of said container and adapted to engage slidably with the opposite lateral sides of said ring for guiding said ring in lateral directions and for preventing said materials from passing into the annular gap between said container wall and said ring.

10. An apparatus as defined in claim 9, in which each pair of said guide strips forms the two arms of an arcuate guide rail having a U-shaped cross section.

11. An apparatus as defined in claim 1, in which each of said rings is made of an extruded strip of plastic having steel inserts and bent to a circular shape, the ends of said strip then being welded together.

12. An apparatus as defined in claim 11, in which said inwardly extending projections on said rings form lugs, and screws securing said lugs to the inner sides of said rings and screwed into said steel inserts.

13. An apparatus as defined in claim 1, further comprising a drain valve on one end wall of said container, and a coarse filter removably inserted into said container adjacent to said drain valve.

14. An apparatus as defined in claim 1, further comprising means adapted to be connected to the longitudinal wall of said container for inserting solid chemicals into said container.

15. An apparatus as defined in claim 1, in which said container has a double wall enclosing at least one channel for passing a heating or cooling medium through said channel.

16. An apparatus as defined in claim 1, further comprising means adapted to extend at least at the end of the treatment of said materials from one end of said apparatus through the empty space of said rings above said container for depositing thereon the treated materials when said materials after being taken along by said projections on said rotating rings and lifted out of said container drop by gravity off said projections.

17. An apparatus as defined in claim 16, in which said last means are conveying means for also removing said deposited materials from said apparatus.

18. An apparatus as defined in claim 17, in which said conveying means are also adapted to insert said materials into said container for being treated therein.

19. An apparatus as defined in claim 9, in which at one lateral side of said container the longitudinal wall thereof is provided with apertures between said guide strips for adjacent rings, and an additional wall extending upwardly and outwardly from said longitudinal wall at an acute angle to a horizontal plane from a position below said apertures.

20. An apparatus as defined in claim 19, in which said additional wall has an aperture through which said materials after being treated may be removed from said container, and a cover for closing said last aperture.

References Cited
UNITED STATES PATENTS

| | | | |
|---|---|---|---|
| 408,690 | 8/1889 | Burton et al. | 68—58X |
| 2,312,657 | 3/1943 | Locke | 68—58X |
| 3,293,891 | 12/1966 | Sulzmann | 68—58 |
| 3,352,131 | 11/1967 | Smith | 68—58 |

FOREIGN PATENTS

| | | | |
|---|---|---|---|
| 489,794 | 8/1938 | Great Britain | 68—58 |

OTHER REFERENCES

German printed application, 1,074,355, Jan. 28, 1960, Ruthner.

WILLIAM I. PRICE, Primary Examiner

U.S. Cl. X.R.

68—17, 18, 140, 210; 69—30